United States Patent

Bauer et al.

Patent Number: 5,195,206
Date of Patent: Mar. 23, 1993

[54] WINDSHIELD CLEANING SYSTEM, ESPECIALLY FOR MOTOR VEHICLES

[75] Inventors: Kurt Bauer, Ingersheim; Eckhardt Schmid, Brackenheim; Bernd Walther, Bietigheim-Bissingen, all of Fed. Rep. of Germany

[73] Assignee: SWF Auto Electric GmbH, Bietigheim Bissinger, Fed. Rep. of Germany

[21] Appl. No.: 623,375
[22] PCT Filed: Mar. 2, 1990
[86] PCT No.: PCT/EP90/00345
   § 371 Date: Dec. 21, 1990
   § 102(e) Date: Dec. 21, 1990
[87] PCT Pub. No.: WO90/10562
   PCT Pub. Date: Sep. 20, 1990

[30] Foreign Application Priority Data

Mar. 11, 1989 [DE] Fed. Rep. of Germany ....... 3907962

[51] Int. Cl.⁵ ................................................. B60S 1/46
[52] U.S. Cl. .............................. 15/250.01; 239/284.1; 137/580; 277/71; 285/98; 285/275
[58] Field of Search ........... 15/250.01, 250.02, 250.03, 15/250.04, 250.34; 239/284.1, 284.2; 137/580; 285/95, 275, 276, 98, 14, 134, 165, 347; 277/53, 71

[56] References Cited

U.S. PATENT DOCUMENTS

| 933,290 | 9/1909 | Clay | 137/580 |
| 2,483,243 | 2/1944 | Smulski | 15/250.04 |
| 2,679,434 | 5/1954 | Herrmann | 137/580 |
| 3,129,960 | 4/1964 | Schrodt | 285/275 |
| 3,591,206 | 7/1971 | Giovagnoli | 285/158 |
| 3,760,451 | 9/1973 | Steed | 15/250.02 |
| 3,887,956 | 6/1975 | Wind | 15/250.04 |
| 4,313,624 | 2/1982 | Zierden et al. | 285/14 |
| 4,439,887 | 4/1984 | Fischer et al. | 15/250.04 |
| 4,893,374 | 1/1990 | Bienert et al. | 15/250.04 |

FOREIGN PATENT DOCUMENTS

| 8100709 | 7/1982 | Fed. Rep. of Germany . | |
| 3632734 | 3/1988 | Fed. Rep. of Germany | 15/250.01 |
| 3643476 | 6/1988 | Fed. Rep. of Germany . | |
| 0194140 | 11/1982 | Japan | 15/250.04 |
| 0247543 | 11/1986 | Japan | 15/250.01 |

Primary Examiner—Harvey C. Hornsby
Assistant Examiner—Gary Graham
Attorney, Agent, or Firm—Robert P. Seitter; J. Gordon Lewis

[57] ABSTRACT

A windshield cleaning system with a washing system includes a washing liquid pipe non-rotatably fixed in a bore of a wiper shaft, the end of which washing liquid pipe is inserted into a pot-like connecting piece protected against twisting. Thereby the connecting piece is bracelessly centered with respect to the end of the washing liquid pipe so that it can also make a possible wobbling movement of the end in radial direction. Thus a long lifetime of the connecting point between the rotating end of the washing liquid pipe and the non-rotatable connecting piece is achieved.

11 Claims, 8 Drawing Sheets

WINDSHIELD CLEANING SYSTEM, ESPECIALLY FOR MOTOR VEHICLES

INTRODUCTION

The invention relates to a windshield cleaning system, especially for motor vehicles.

BACKGROUND OF THE INVENTION

Windshield cleaning systems, in which the washing liquid is supplied to jets for the purpose of improving the effect of the washing system, which jets are arranged on the wiper arm-and-blade assembly and are moving to and fro with it, are already known. In a known embodiment of this kind the washing liquid is supplied through a pipe within a bore in a wiper shaft, whereby the end of the washing liquid pipe at the drive end of the wiper shaft axially engages into a pot-like connecting piece from which a tube stud for connecting a washing liquid supply tube is sticking out. In such a system the washing liquid pipe is moving to and fro like the wiper shaft, whereas the connecting piece is non-rotatably fixed because otherwise, the washing liquid supply tube would considerably be strained during operation of the cleaning system and there would be danger of tearing off after a longer time of operation. In an embodiment according to the DE-OS 36 43 476 or the DE-GM 81 00 709 the connecting piece is fixed onto a frame via an extension arm radially sticking out. In both cases not only a protection against twisting is realized by this extension arm, but also the connecting piece is rigidly fixed onto a stationary member.

Due to the necessary relative movement in such embodiments a seal between the end of the washing liquid pipe and the connecting piece is provided, which seal meets high requirements and still works reliably even after a longer time of operation. Because of fixing the connecting piece stable in form in a rigid manner this is not guaranteed in the known embodiments. Relatively big wear of the bearing surfaces between the end and the connecting piece is also disadvantageous.

BRIEF DESCRIPTION OF THE INVENTION

Thus the object of the present invention is to develop such a windshield cleaning system by using easy means in such a way that operation, especially perfect seal and bearing without play is guaranteed even after a longer time of operation.

One aspect of the invention is based on the idea that, when the connecting piece is resilently centered with respect to the end of the washing liquid pipe, the eccentric movement or the balance error of the wiper shaft, which cannot be excluded after some time of operation, does not negatively affect the seal between the connecting piece and the end because the connecting piece can also make this movement caused by balance error. Thus instead of fixing the connecting piece rigidly and in a way that is stable in form onto a stationary member as it is done in the known embodiments, according to the invention the connecting piece is flexibly mounted. The resilient centering can also be described in such a way that the connecting piece is held in a plane cross-wise to the axial direction of the shaft only by means of the end so that with respect to the stationary member only one security preventing the connecting piece from twisting is necessary. Thus in such an embodiment no radial forces are exerted onto the bearing point so that there is no danger of early wear.

According to another aspect of the invention, all these protections against twisting must be made in such a way that the connecting piece can radially freely be moved in each direction to a certain degree. So if for instance, the protection against twisting comprises a fork-like stud sticking out of the connecting piece, between the tines of which stud a stationary holding element engages, it should be possible to swivel this fork-like stud around the holding element to a certain extent. This can be achieved in a very simple way by forming this holding element as a round rod.

According to other aspects of the invention, different alternatives for resiliently pressing the connecting piece onto the end of the washing liquid pipe are described. In preferred embodiments the resilient element necessary for this purpose is fixed onto the stationary element which, as a part of the protection against twisting, is necessary anyway. By using one member in different ways manufacturing and assembling costs can be kept low. Thereby it is also important that this resilient element is formed in such a way that a radial movement of the connecting piece is permitted so that the braceless centration of said connecting piece with respect to the end of the washing liquid pipe is not reduced.

Further advantageous developments of the invention are characterized, which developments refer to the seal between the stationary connecting piece and the swivellable end of the washing liquid pipe. Thereby it is taken care that the sealing elements are arranged in such away that the bearing points are separated from the washing water and can thus be greased, as it will be explained later on.

Further aspects of the invention to the integration of a non-return valve in the space between the washing liquid channel and the connecting piece. For such a solution independent protection is claimed because such an integration has advantages of costs even then, when a braceless centration of the connecting piece on the shaft should not be possible for technical reasons.

The basic ideas of the invention can be realized in windshield cleaning systems in which the drive motor with the gear is arranged separately from the wiper bearing. Systems of this kind are normally used for cleaning windshields in motor vehicles. The basic ideas of the present invention can also be realized in a wiper system, for instance for rear windows or headlights, in which the wiper motor with the gear and the wiper shaft are arranged in one housing. In this case the washing water has to be delivered through the motor or the gear housing and to be supplied to the jet through the washing liquid pipe inside the wiper shaft.

In such wiper systems, too, the connecting piece is to be centered bracelessly concerning the end of the washing liquid pipe so that too much wear is avoided. In a preferred embodiment the end of the washing liquid pipe is to penetrate a bore of the lid of the gear housing, whereby the connecting piece is movably fixed—crosswise to the washing liquid pipe onto the outer side of the lid turning away from the gear. In such embodiments the lid of the gear housing need not perfectly be centered in relation to the wiper shaft, and in addition, the advantage of such a solution is that the connecting piece with the seals lying therein can easily be changed in case of failure. Other advantageous developments of the invention are characterized, which developments refer to a seal of the bore that can easily be assembled.

This bore is provided in the lid of the gear housing for penetration of the end of the washing liquid pipe. According to an advantageous development the holding plate provided for this purpose comprises a bush which simultaneously serves as a bearing bush for the wiper shaft. This fact can also be described in such a way that the connecting piece is formed of two parts, whereby the lid of the gear housing is located between the two parts as soon as these two parts are locked within each other. By the features of the invention the two parts of the connecting piece are locked within each other in an especially stable way so that, when putting the tube onto a pipe stud on the connecting piece there is no danger of detaching this connecting piece from the lid of the gear housing unintentionally.

Still other aspects of the invention refer to special features concerning the seal between the connecting piece and the end of the washing liquid channel, which features ensure a long lifetime.

The invention and advantageous developments thereof are described in the accompanying drawings.

DETAILED DESCRIPTION OF THE PREFERRED AND ALTERNATIVE EMBODIMENTS

Figures 1, 2:
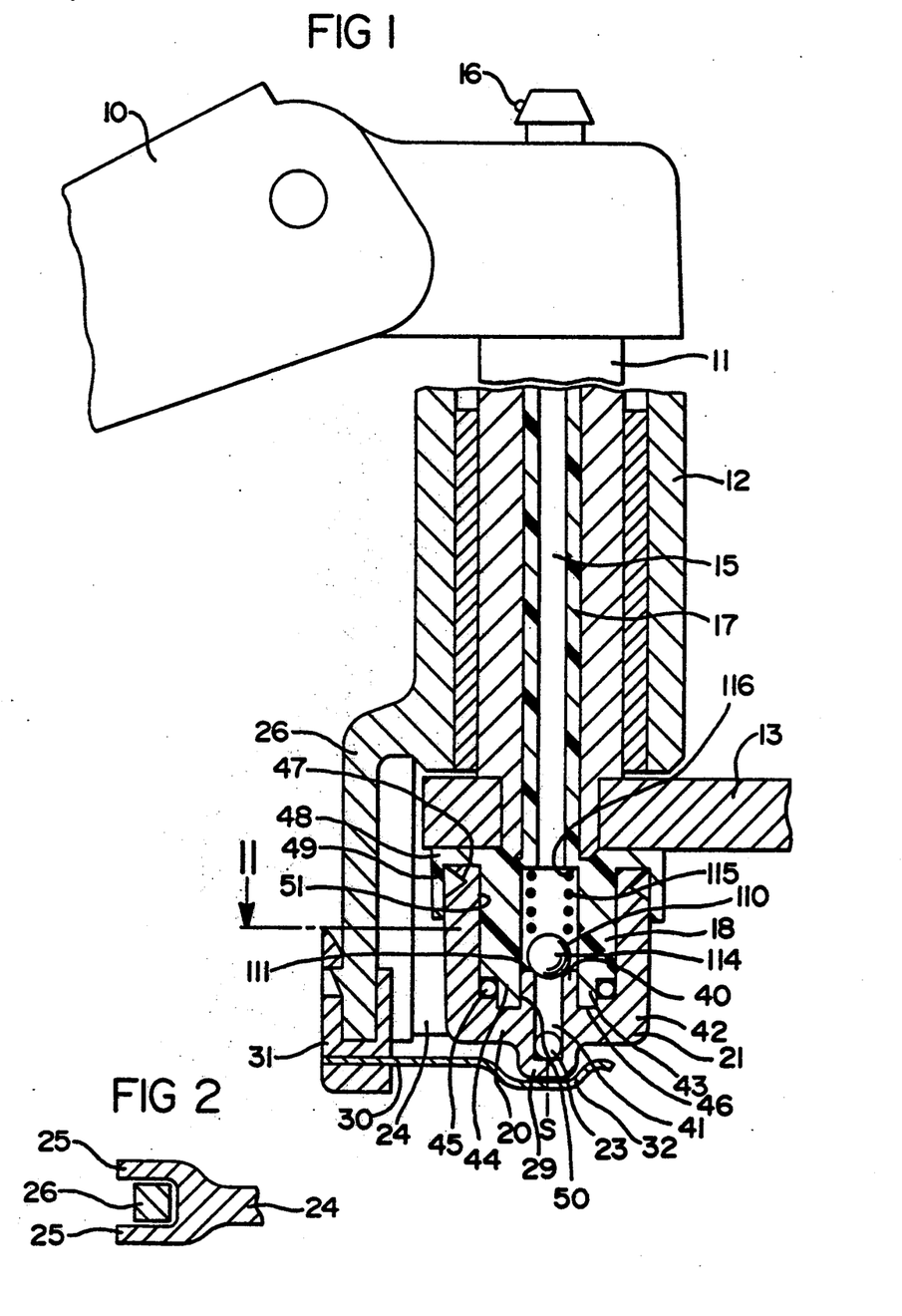
FIG. 1, is a schemematic view of a section of a wiper shaft with a connecting piece.
FIG. 2, is a partial section taken along the line II of FIG. 1.

Normally a windshield cleaning system of a motor vehicle comprises a wiper arm-and-blade assembly, only the wiper arm 10 of which is indicated in FIG. 1. The wiper arm is fixed onto the end of a wiper shaft 11, which is rotatably mounted in a bearing bush 12. The wiper shaft is driven in pendulum-motion via a suitable gear comprising a swivelling lever 13 which is non-rotatably fixed onto the drive end on the wiper shaft 11. Constructions of this sort are well known and therefore no further explanations will be necessary.

The windshield cleaning systems of modern motor vehicles comprise a washing system via which the washing liquid is sprayed onto the windshield to be cleaned. In the present invention washing liquid is supplied to a jet 16 through an axial bore 15 in the wiper shaft. Either the axial bore 15 in the wiper shaft 11 or a pipe portion 17 can serve as the washing liquid pipe, which pipe portion 17 is inserted or is directly injection-moulded into bore 15. Thereby the jet 16 terminates the one end of pipe portion 17. Normally this does not cause any problems because at this point there is no relative movement between the two parts to be connected, that is, between the jet 16 and the pipe portion 17. At the other end 18 of pipe portion 17, which is regarded as a washing liquid pipe, is axially inserted into a connecting piece generally designated by 20, which connecting piece 20 is protected against twisting. Thus at this point a relative movement is carried out between the end 18 of the washing liquid pipe 17 and connecting piece 20, requiring a seal of robust design.

The connecting piece 20 is generally formed like a pot and has a connecting stud 22 with a supply channel 23 for the washing liquid, which connecting stud 22 is arranged on the bottom 21 and is radially sticking out of it. Furthermore a fork-like stud 24 with two tines 25 at the end are radially sticking out of the connecting piece 20, which tines 25 grip a holding element generally designated by 26 and integrally axially sticking out of the bearing bush 12. The connecting piece 20 is axially put onto the end 18 of the washing liquid pipe 17, whereby a resilient element formed as a leaf spring 30 secures connecting piece 20 in axial direction. In the embodiment according to FIG. 1 leaf spring 30 is fixed directly on the stationary holding element 26 by means of a clamp 31 and centrically acts upon the bottom 21 of the connecting piece 20.

Therefore with respect to FIG. 1 the connecting piece 20 is bracelessly centered immediately at the end 18 of the washing liquid pipe. For instance, in case of balance error in the wiper shaft, this connecting piece can also make a wobbling movement of the wiper shaft in a plane cross-wise to the wiper shaft to a certain extent because is that this connecting piece 20 is not rigidly fixed onto a stationary member, but that the holding means are flexibly formed. The elements serving for protection against twisting, namely the fork-like stud 24 with the tines 25 as well as the holding element 26 permit a compensation of possible tolerances in one direction radially to the axis of symmetry S of the wiper shaft and the connecting piece 20. So a connection, to a large extent free of wear, between the connecting piece 20 protected against twisting and the rotating end 18 of the washing liquid pipe 17 is provided.

In the embodiment according to FIG. 1 a cylindrical stud 40 centrically starts off from the bottom 21 of the pot-like connecting piece 20, which stud 40 comprises a bore 41 as a washing liquid channel. Between cylindrical stud 40 and a side wall 42, a ring space 43 is formed, into which a ring flange 44 axially sticking out of the end 18 of the washing liquid pipe 17 engages in a form-fitting way. Between ring flange 44 and the side wall 42 a radial seal is realized by way of an O-ring 45. Thereby the transverse side 46 on ring flange 44 serves as a supporting surface on which due to the resilient effect of the resilient element 30 the connecting piece 20 lies sealingly. In the embodiment according to FIG. 1 a sealing lip 47 is axially sticking out of the transverse side of the connecting piece 20, which sealing lip 47 sealingly lies on a radial flange 48 on the end 18 of the washing liquid pipe 17. A ring flange 49 covering the sealing lip 47 like a collar axially depends from radial flange 48.

FIG. 1 makes clear that several sealing surfaces are formed between the stationary connecting piece 20 and the end 18 of the washing liquid pipe 17. A first sealing surface is provided between the bottom of the connecting piece 20 and the supporting surface 46 on the end 18 of the washing liquid pipe. A second sealing is realized by the O-ring 45. Of course, a seal is also realized in the area of bearing surfaces 50 and 51 between the end 18 of the washing liquid pipe 17 and the connecting piece 20. After all, a seal is made by the sealing lip 47 on the radial flange 48. So it is ensured that also in case of higher supply pressure no washing liquid gets out at the connecting point between the connecting piece 20 and the washing liquid pipe 17 in the wiper shaft 11. Thereby it is taken care that the greased bearing surfaces 51 are sealed with respect to the washing liquid on the one hand by the sealing ring 45, and also with respect to dirty water, on the other hand, by the sealing lip 47.

Figure 3:
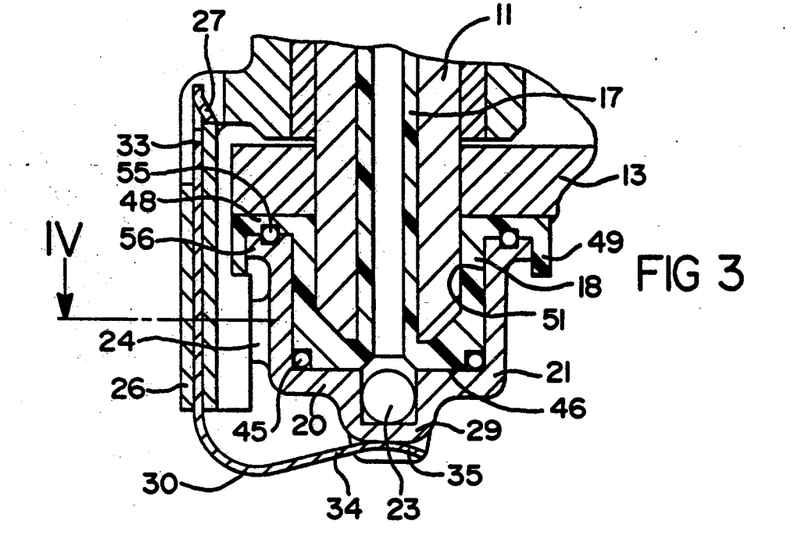
FIG. 3, is a partial section of another embodiment.
Figure 4:
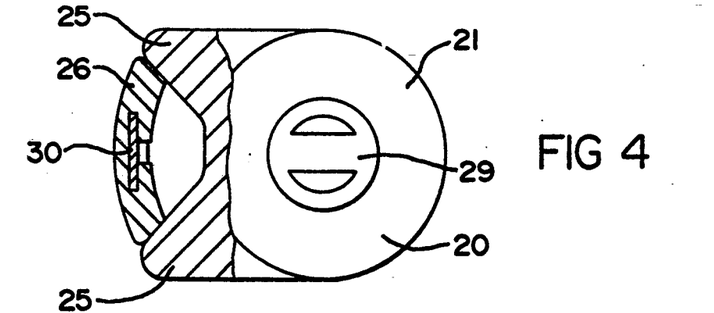
FIG. 4, is a partial section taken along the line IV of FIG. 3.

With respect to the form of the protection against twisting by way of fork-like stud 24 and holding element 26 the embodiment according to the FIGS. 3 and 4 does not differ from the embodiment according to the FIGS. 1 and 2. However, in this embodiment according to FIG. 3 the resilient element 30 is formed as an angularly deflected leaf spring, the one leg 33 of which is put in a slot 27 parallel running to the wiper shaft 11 in the stationary holding element 26 and is locked there. The other leg 34, again, acts upon the bottom 21 of the connecting piece 20 substantially centrically, whereby, again, it is taken care, that resilient element 30 does not reduce a movement of the connecting piece 20 in a plane cross-wise to the wiper shaft. For this purpose resilient element 30 has a ball-like knob 35 cooperating with a stud 29, that is also ball-like, on the connecting piece 20 in such a way that substantially only a point-like contact is given. In the embodiment according to FIG. 1, however, this stud 29 engages into a ball-like recess 32 at the end of the resilient element 30 arranged in such a way that a relative movement is possible. In the embodiment according to FIG. 3 the end portion of the wiper shaft 11 projects into the pot-like connecting piece 20 so that stability of the arrangement is increased.

The end 18 of the pipe portion 17 surrounds the end of the wiper-shaft 11 like a pot, whereby a bearing surface 50 is only formed between end 18 and the connecting piece 20. Since the end 18 of the washing liquid channel 17 and the connecting piece 20 are made of plastics, the bearings can be paired without wear by selecting the respective materials. Besides, the embodiment according to FIG. 3 differs from the embodiment according to FIG. 1 additionally in the fact that another O-ring 55 is provided, which O-ring 55 acts as a seal between the radial flange 48 on the end 18 of the washing liquid pipe 17 and a radial flange 56 on the connecting piece 20. The two seals formed by the O-rings 45, 55 are situated at an axial distance of each other, whereby between these two seals there is a bearing surface 51 between the end 18 of the washing liquid pipe 17 and the connecting piece 20, which bearing surface 51 can be greased, for this grease cannot flow out nor can it get into touch with the washing liquid.

Figure 5:
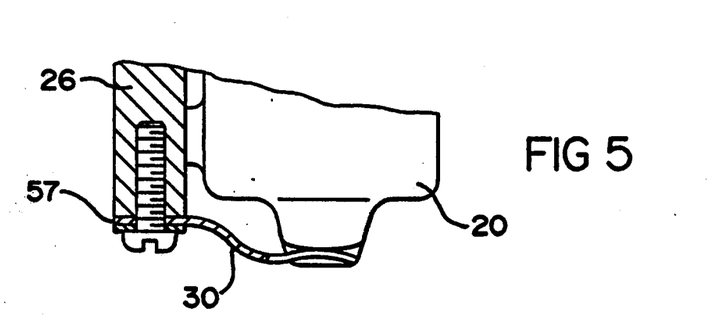
FIG. 5, is a partial section of another embodiment.

FIG. 5 differs form the embodiment according to FIG. 3 only in another arrangement of the resilient element 30 which, again, is formed as a leaf spring and which is swivellably fixed, in the illustrated embodiment is screwed, onto the transverse side 57 of the stud or holding element 26 around an axis parallelly to the wiper shaft.

Figure 6:
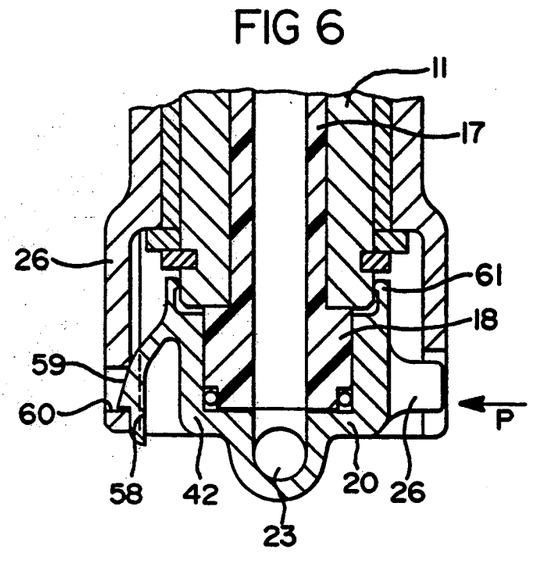
FIG. 6, is a partial section of another embodiment.
Figure 7:
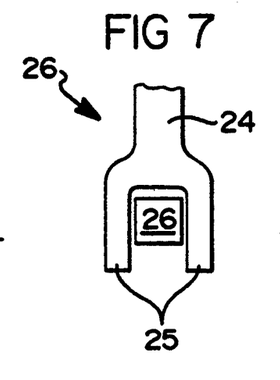
FIG. 7, is a view in the direction of arrow P of the embodiment according to FIG. 6.

In the embodiment according to the FIGS. 6 and 7 several tabs 58, resilient in radial direction, are formed onto the connecting piece 20, only one of which can be seen in the drawing. The connecting piece is supported on the stationary stud 26 in axial direction via tab 58. Tab 58 has a locking lug 59 which snaps behind a stop 60 of a recess, when putting the connecting piece 20 onto the end 18 of the washing liquid pipe 17. Thus no additional resilient element in form of a leaf spring is needed. By way of tab 58 the protection against twisting can be formed simultaneously, but also additional holding elements can be provided, which holding elements engage between the tines 25 of a stud 26 sticking out of the bearing bush 12 in axial direction. Besides, in this embodiment the swivelling lever 13 next to the driven end of the wiper shaft is fixed onto the wiper shaft so that stud 26 on the drive end is formed as a surrounding collar which consequently protects the connecting piece 20 in radial direction against influences from outside.

In FIG. 6, the connecting piece 20 comprises a sealing lip 61 starting off from the transverse side of said connecting piece 20, which sealing lip 61 immediately lies on the end of the wiper shaft 11 and not on the end 18 of the washing liquid channel 17. Considering that in the previous embodiments the connecting piece exclusively is in contact with the end of the washing liquid channel, in the embodiment according to FIG. 6 there is a direct contact between connecting piece 20 and the wiper shaft 11. Thus in this embodiment the side wall 42 of the connecting piece 20 is put over the end 18 and a partial area of the wiper shaft 11.

Figure 8:
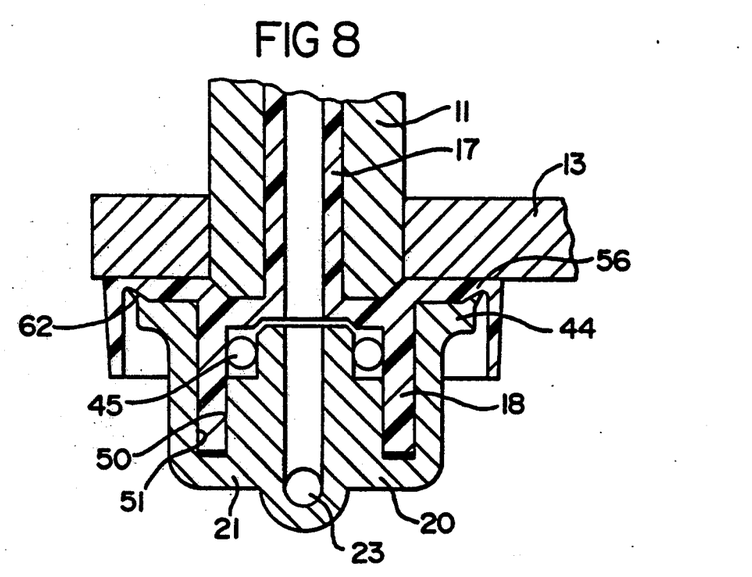
FIG. 8, is a partial section of another embodiment.

FIG. 8 shows an embodiment with another form of the different seals. The O-ring 45 is not closely arranged to the bottom 21 of the connecting piece 20. but is closely located to the end of the wiper shaft 11. In this embodiment, on the one hand, the radial flange 56 and, on the other hand, the ring flange 44 on the connecting piece 20 serve as an axial surface. Instead of the O-ring 55 in the embodiment according to FIG. 3 in this case, however, a sealing lip 62 axially sticking out is provided. Again, the two seals by way of the O-ring 45 and sealing lip 62 are arranged at a distance of each other so that greased bearing surfaces 50, 51 are formed in-between. Thereby it is taken care that the diameter of the O-ring 45 is relatively small so that the axial force exerting the pressure of the washing liquid supplied via the supply channel 23 onto it remains small.

Figure 9:
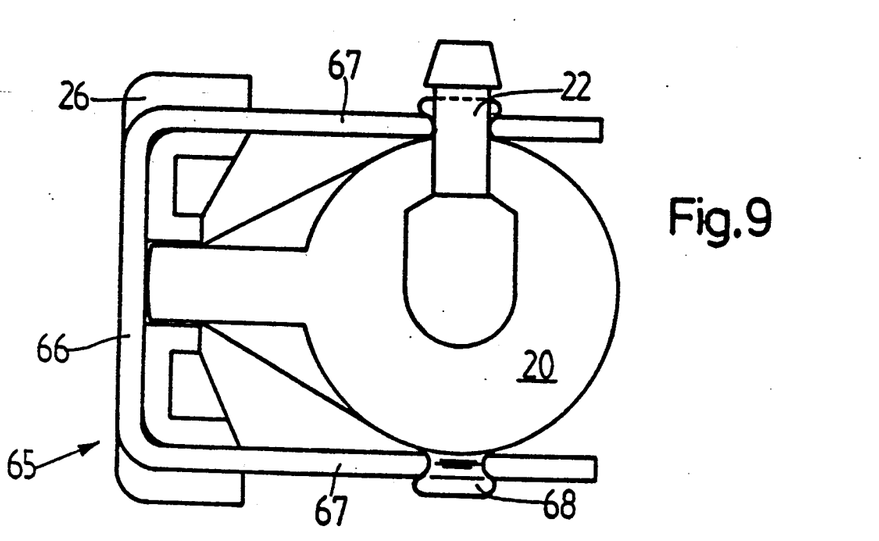
FIG. 9, is a view of another embodiment.
Figure 10:
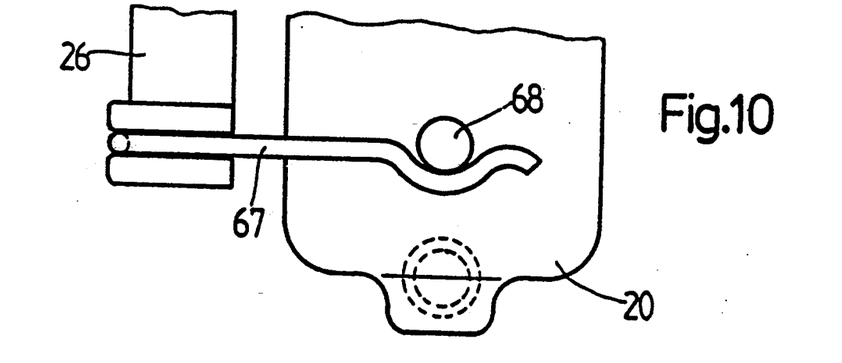
FIG. 10, is a lateral view of the embodiment according to FIG. 9.

In the embodiment according to the FIGS. 9 and 10 a substantially U-shaped wire yoke 65 is used as a resilient element instead of a leaf spring. Wire yoke 65, the web 66 of which is fixed onto the stationary stud 26, acts upon holding pins 68 diametrically positioned to each other on the circumference of the connecting piece 20 by means of its free legs 67. Such a resilient element can be produced and assembled at low costs.

Figure 11:
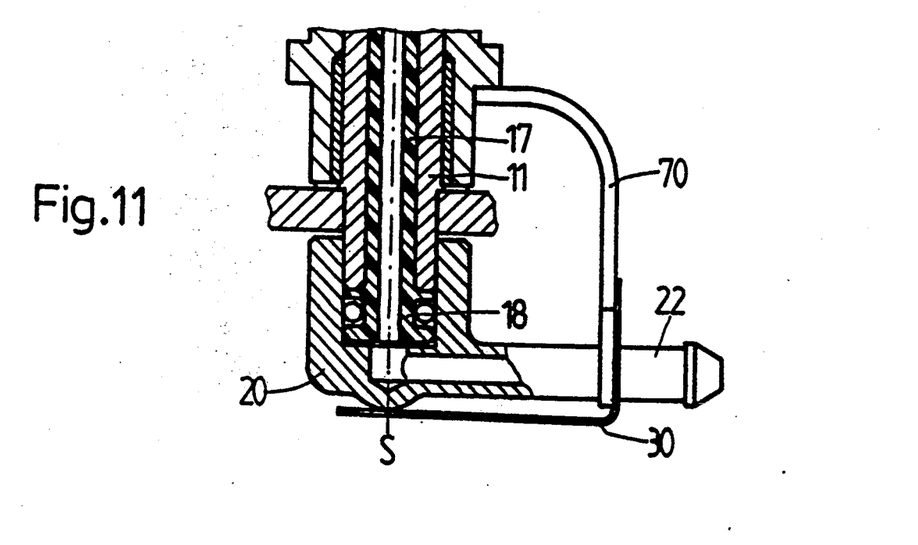
FIG. 11, is a section of another embodiment.

In the embodiment according to FIG. 11 a holding yoke 70 serving as a protection against twisting acts upon the connecting stud 22 of the connecting piece 20, that is at a relatively big distance of the axis of symmetry S. Again, a leaf spring 30 serves as a resilient element for supporting the connecting piece 20 axially, which leaf spring 30 is fixed onto holding yoke 70. Besides, this embodiment shows again, that the connecting piece 20 is immediately put over the end 18 of the washing liquid channel 17 and, in addition, over the end of the wiper shaft 11.

The embodiments described so far refer to windshield cleaning systems in which the wiper shaft is assembled in independence of the drive motor or the gear thereof in a motor vehicle. In the FIGS. 12 to 20 an embodiment is illustrated in which the end 18 of the washing liquid pipe 17 penetrates a bore 80 in a lid 81 of the gear housing, whereby the connecting piece 20 is arranged on the outer side 83 turning away from the gear, a toothed wheel 82 non-rotatably connected with the wiper shaft 11 can be seen. In such an embodiment it has not only to be taken care that a perfect seal is given between the wiper shaft 11 or the end 18 of the washing liquid channel 17, but a construction of this sort has to be chosen so that the gear, that is the toothed wheel 82, is protected against influences from outside. Especially it must be avoided that possible grease from the gear housing can flow outside because otherwise operativeness of the windshield cleaning system can be reduced. Thus this means that the bore 80 in the lid 81 of the gear housing has to be sealed, whereby, of course, in correspondence with the present invention, a construction has to be chosen, which construction does not prevent the connecting piece 20 from being bracelessly centered on the wiper shaft 11 or the end 18 of the washing liquid channel 17.

On the inner side 84 of the lid 81 of the gear housing a substantially square holding plate 85 is arranged, which holding plate 85 comprises holding pins 86 perpendicularly sticking out and penetrating respective apertures 87 in the gear housing lid 81. Holding pins 86 serve as fastening means for the connecting piece 20 what will be explained later on. Furthermore a bush 88 is centrically sticking out of the holding plate 85, which bush 85 penetrates the bore 80 in the lid 81 of the gear housing. Thereby it is of importance that the diameter DB of this bush is smaller than the diameter D of the bore 80 so that holding plate 85 can be moved crosswise to the washing liquid pipe. For this purpose, of course, the apertures 87 must be bigger than the cross-section of the holding pins 86 in this area, so that holding pins 86, too, penetrate apertures 87 with lateral play. Especially in the FIGS. 15 and 16 it can be seen that locking hooks 89 are sticking out from the outside of this bush 88, which locking hooks 89 also serve as fastening means for the connecting piece 20. In total, four locking hooks 89 of this sort are provided, which are evenly distributed on the circumference of the bush.

The connecting piece 20 has a ring flange 90 with receiving holes 91 for the holding pins 86. In the side walls of the connecting piece 20 four recesses 92 cooperating with the locking hooks 89 on the holding plate 85 are evenly distributed on the circumference.

The unit consisting of gear and wiper shaft is assembled as follows: Holding plate 85 is pre-assembled on the lid 81 of the gear housing, whereby the holding pins 86 penetrate the apertures 87 and hold the holding plate 85 on the lid 81 of the gear housing by way of their locking lugs expanding again. A seal 96 is put onto the outer side 83 of the lid of the gear housing. Then the connecting piece 20 is put on, whereby the holding pins 86 engage into the receiving holes 91 and the locking lugs 89 snap into the recesses 92. By way of these fastening means, that is, the locking hooks 89 and the recesses 92 or the holding pins 86 and the apertures 87, the connecting piece 20 arranged on the outer side 83 is locked with the holding plate 85 arranged on the inner side 84 in such a way that the parts lie on the lid of the gear housing from opposite sides under little tension while putting sealing ring 96 in-between. By dimensioning the fastening elements in a suitable manner it can be achieved that the bore 80 and the apertures 87 in the lid 81 of the gear housing are sealed sufficiently, but that nevertheless the movability of the holding plate 85 and of the connecting piece 20 in one plane cross-wise to the wiper shaft or parallelly to the lid 81 of the gear housing is not reduced. In this embodiment, too, the connecting piece is bracelessly centered with respect to the end 18 of the washing liquid pipe 17. A protection against twisting permitting a compensation of tolerances in radial direction is realized by cooperation of the holding pins 86 and aperture 87.

Besides, with respect to this embodiment it should be noted that the bush 88 on the holding plate 85 directly serves as a bearing bush for the wiper shaft 11. Thus this means, that the holding plate 85, too, is bracelessly centrically mounted on the wiper shaft 11 or on the end 18 of the washing liquid channel 17. Especially FIG. 14 makes clear that this bearing bush 88 projects into the pot-like receiver on the connecting piece 20, whereby a sealing element 99 axially acting is provided between the transverse side 97 of bearing bush 88 and a stud 98 on the connecting piece 20, which sealing element 99 comprises a sealing lip 100 that radially lies on the end 18 of the washing liquid pipe 17. A collar 101 sticks out of the transverse side 97 of the bush 88, which collar 101 supports this sealing lip 100 so that even in case of high operational pressure reliable seal is achieved.

Figure 12:
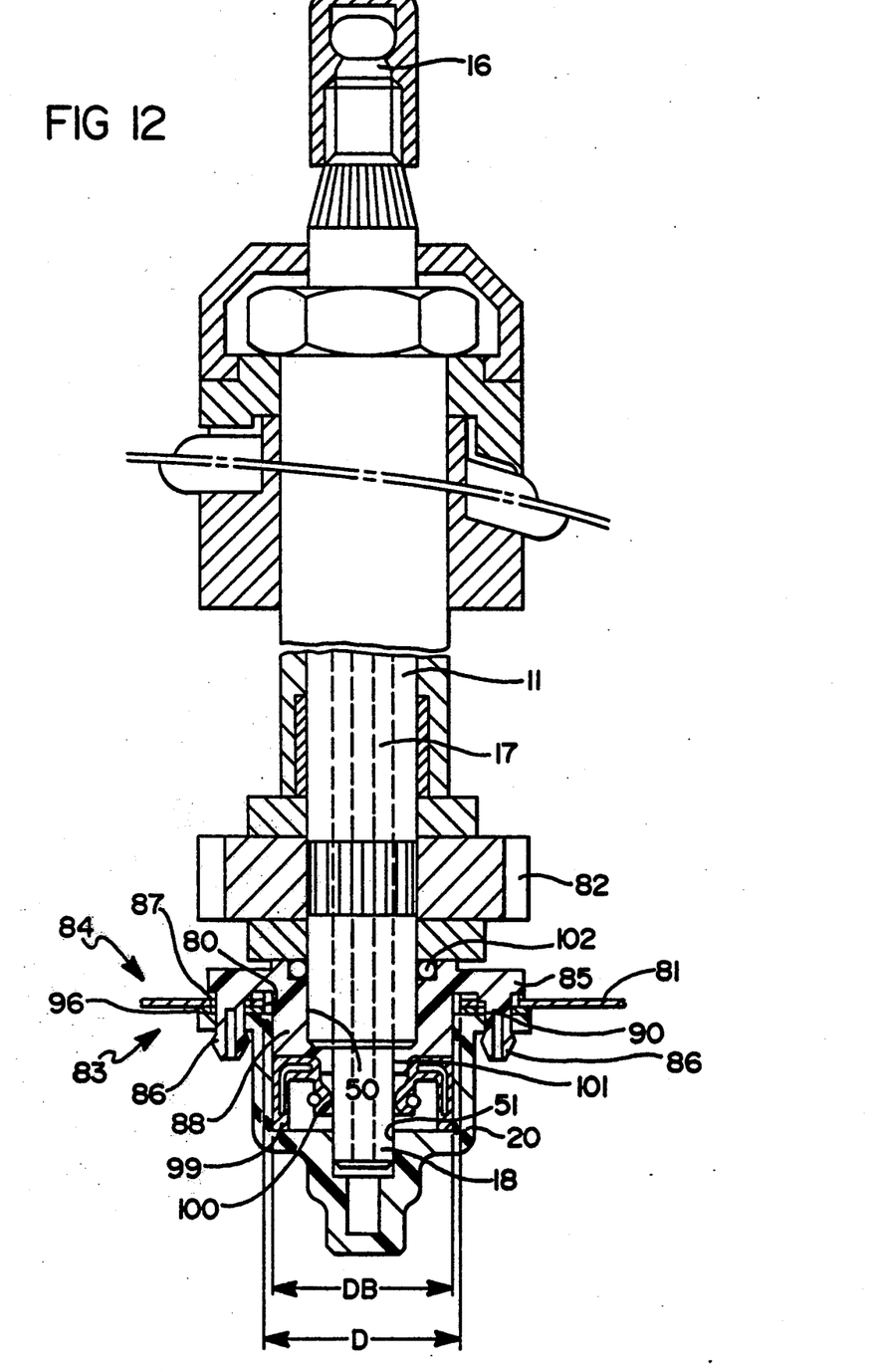
FIG. 12, is a section of an embodiment of a wiper shaft extending a gear housing.
Figure 13:
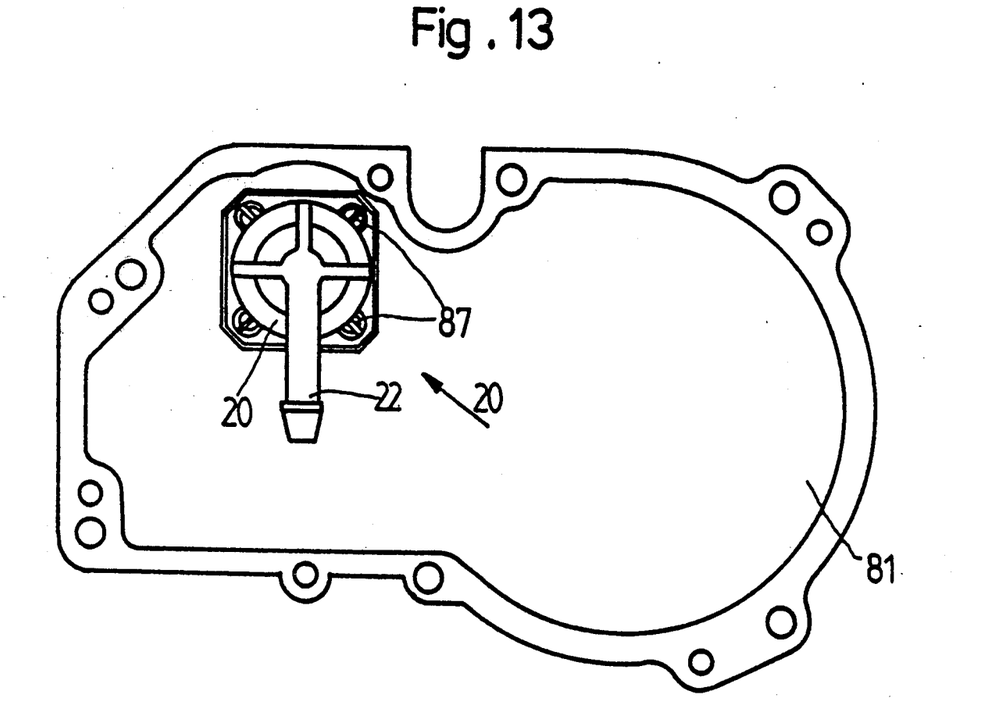
FIG. 13, is a view of the lid of the gear housing.
Figure 14:
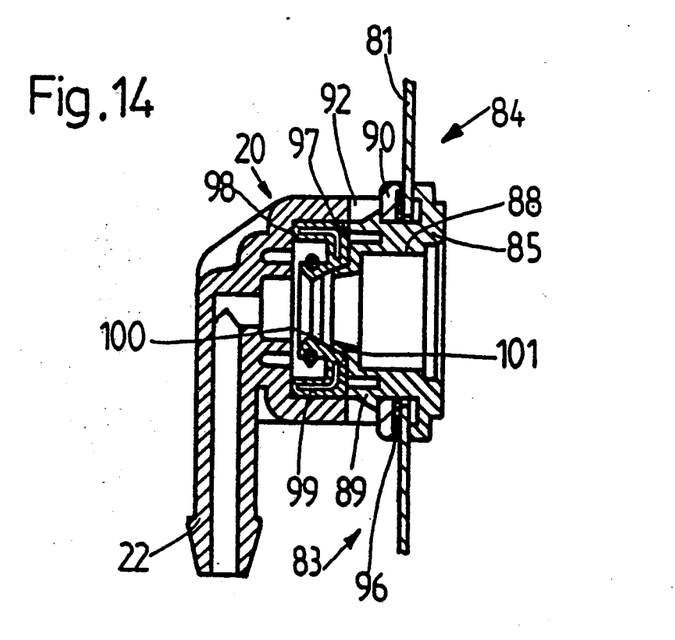
FIG. 14, is an enlarged section of a connecting piece.
Figure 15:
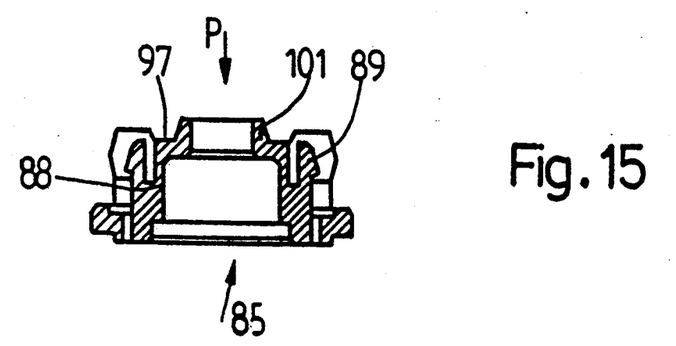
FIG. 15, is a section of a holding plate for the connecting piece.
Figure 16:
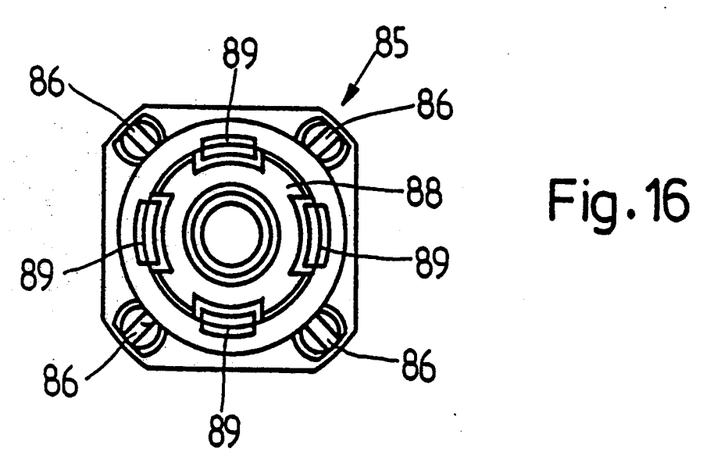
FIG. 16, is a view in the direction of arrow P of the holding plate of FIG. 15.
Figure 17:
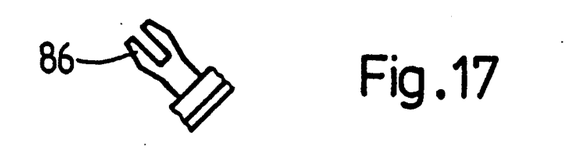
FIG. 17, is a holding pin of the holding plate.
Figure 18:
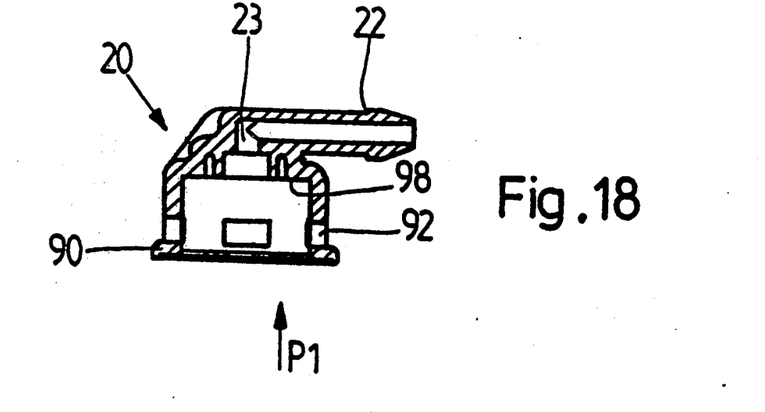
FIG. 18, is a section of the connecting piece.
Figures 19, 20:
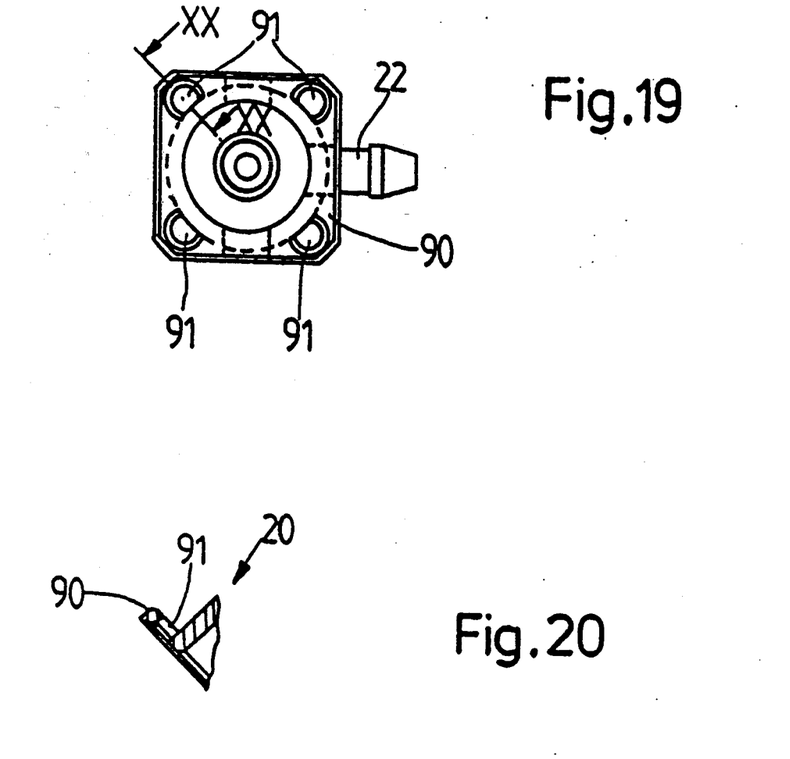
FIG. 19, is a view in the direction of arrow P1 of FIG. 18.
FIG. 20, is a partial section taken along the line XX in FIG. 19.

FIG. 12 shows that there are two bearing surfaces 50, 51, whereby a bearing surface 50 cooperates with the wiper shaft 11 and a bearing surface 51 cooperates with the end 18 of the washing liquid pipe 17. This construction can also be described in such a way that the connecting piece 20 is formed of two parts, whereby the two parts 85, 20 receive the lid 81 of the gear housing between themselves and are locked within each other non-rotatably and non-movably. On both parts there are bearing surfaces, whereby one bearing surface is centered with the wiper shaft and another bearing surface is centered with the washing liquid channel.

Furthermore especially FIG. 12 makes evident that an additional sealing between the holding plate 85 and the wiper shaft 11 is possible also by way of an O-ring 102 so that the grease of the gear is prevented from flowing out.

Besides, in FIG. 1 it is indicated that a non-return or check valve 110 can be integrated into the connecting piece 20. On a transverse side 111 of the stud 20 centrically sticking out of the bottom 21 of the connecting piece 20 and provided with an axial bore 41 a valve seat for a valve closing member is formed in the shape of a ball 114. A valve closing spring 115 is centrically supported on a ring shoulder 116 on the pipe portion 17 and presses the valve closing member 114 onto its valve seat. This non-return valve prevents the washing liquid pipe from emptying in a known manner.

Finally it should be noted again that by means of the features of the present invention a connection of little wear between the rotating end of the wiper shaft and the non-rotatable connecting piece is provided, which connection achieves a long lifetime.

What is claimed is:

1. A windshield cleaning system comprising a shaft rotatably mounted in a bearing bush for driving a wiper arm-and-blade assembly, said shaft supporting an axial washing liquid pipe, whereby one end of the pipe communicates with a fluid dispensing nozzle and a second end of the pipe on a driven end of the shaft, axially projects into a rotationally fixed cup-like connecting piece communicating with a washing liquid supply tube, wherein the connecting piece is substantially centered with respect to the second end of the washing liquid pipe for limited radial displacement therewith, wherein the second end of the washing liquid pipe penetrates a bore of a lid closing a gear housing and the connecting piece is carried on an outer side of the lid, opposite the gear housing, and extends away from the lid, and wherein a holding plate is carried on an inner side of the lid, toward the gear housing, which holding plate comprises fastening means penetrating the lid and onto which fastening means the connecting piece is fixed.

2. A windshield cleaning system according to claim 1, wherein the washing liquid pipe is injection-moulded into an axial bore in the wiper shaft.

3. A windshield cleaning system according to claim 2, wherein a side wall of the connecting piece encloses the second end of the pipe and a part of the wiper shaft.

4. A windshield cleaning system according to claim 1, wherein the fastening means comprise locking lugs engaging the connecting piece, whereby the holding plate is disposed on the one side and the connecting piece on the other side of the lid of the gear housing, said lugs being under little tension.

5. A windshield cleaning system according to claim 1, wherein the holding plate comprises a bush penetrating the bore on the lid, whereby the characteristic outer diameter of the bush is smaller than the characteristic diameter of the bore and wherein locking hooks extend from an outer side of the bush and engage into the connecting piece behind a flange.

6. A windshield cleaning system according to claim 5, wherein the bush serves as a bearing bush for the wiper shaft.

7. A windshield cleaning system according to claim 5, wherein the bearing bush projects into a pot-like receiver on the connecting piece and wherein between the transverse side of the bearing bush and a stud on the connecting piece, a sealing element axially acting is provided.

8. A windshield cleaning system according to claim 7, wherein the sealing element comprises a sealing lip radially sticking out and sealingly lying on the second end of the washing liquid pipe.

9. A windshield cleaning system according to claim 8, wherein a collar is sticking out of the transverse side of the bearing bush, which collar axially supports the sealing lip.

10. A windshield cleaning system according to claim 1, wherein on the holding plate there are several holding pins as fastening means, each of which penetrates respective apertures in the lid to establish lateral play, and wherein the holding pins are snapped into receiving holes in a flange of the connecting piece.

11. A windshield cleaning system according to one of the claim 1, wherein the connecting piece comprises a bearing area for the end of the washing liquid pipe.

* * * * *